(12) United States Patent
Yeh

(10) Patent No.: US 6,813,722 B1
(45) Date of Patent: Nov. 2, 2004

(54) PROGRAMMABLE TIMING MODULE FOR ADJUSTING CLOCK IN BUS SYSTEM

(75) Inventor: Gon-Jong Yeh, San Jose, CA (US)

(73) Assignee: Rambus, Inc., Los Altos, CA (US)

( * ) Notice: Subject to any disclaimer, the term of this patent is extended or adjusted under 35 U.S.C. 154(b) by 0 days.

(21) Appl. No.: 09/547,881

(22) Filed: Apr. 12, 2000

(51) Int. Cl.⁷ .................................................. G06F 1/04
(52) U.S. Cl. ................................. 713/401; 713/503
(58) Field of Search ........................... 713/400, 401, 713/500, 501, 503, 600; 710/100, 126

(56) References Cited

U.S. PATENT DOCUMENTS

| | | | | |
|---|---|---|---|---|
| 5,805,871 A | * | 9/1998 | Baxter | 713/500 |
| 5,892,927 A | * | 4/1999 | Boehmer et al. | 710/100 |
| 6,239,633 B1 | * | 5/2001 | Miyano | 327/158 |
| 6,324,485 B1 | * | 11/2001 | Ellis | 702/117 |
| 6,338,127 B1 | * | 1/2002 | Manning | 711/167 |
| 6,580,305 B1 | * | 6/2003 | Liu et al. | 327/298 |

* cited by examiner

Primary Examiner—Dennis M. Butler
(74) Attorney, Agent, or Firm—Morgan, Lewis & Bockius LLP

(57) ABSTRACT

A programmable timing module generates a phase adjusted clock signal, suitable for use in a high speed bus system. In one embodiment, the programmable timing includes a signal generator, first and second modulators, and a combiner circuit. The signal generator generates first and second signals based on a clock signal, such that the first and second signals have a phase separation of about 90 degrees. The first modulator receives the first signal and a first modulation control signal, and generates a modulated first signal. The second modulator receives the second signal and a second modulation control signal, and generates a modulated second signal. The combiner circuit receives the modulated first signal and the modulated second signal and is configured to combine the modulated first signal and the modulated second signal to provide the phase adjusted clock signal.

23 Claims, 7 Drawing Sheets

PROGRAMMABLE TIMING MODULE FOR ADJUSTING CLOCK IN BUS SYSTEM

BACKGROUND OF THE INVENTION

The present invention relates to high speed bus systems. More particularly, the present invention relates to a programmable timing module which allows the effective measurement and adjustment of clock signals in a high speed bus system.

Many contemporary bus systems are synchronous in their operation. That is, bus system operations are controlled by one or more clock signals. The bus system shown in FIG. 1A is exemplary. In FIG. 1A, a master 10 is connected to a plurality of slave devices via a high speed bus. Only one connected slave device 13 is shown for the sake of clarity. Slave devices are typically connected to the bus system through a corresponding plurality of connectors (11a . . . 11n). Each connector 11 provides the mechanical and electrical means by which a module, once inserted into the connector, is operatively connected to the bus, and via the bus is connected to master 10.

Modules 13 may be memory devices, memory modules comprising a plurality of memory devices, speciality processors, transceivers, etc. Master 10 may be a microprocessor, a logic unit, a memory controller, a graphics controller, or similar control device.

The bus comprises a plurality of "n" signal lines which may be used to communicate control information, address information and/or data (collectively, "information") between one or more of the modules 13 and master 10. In many high speed bus systems, the signal lines of the bus are necessarily terminated in a termination impedance 20. By carefully matching signal line impedances, information may be effectively transferred at higher speeds.

The bus further includes one or more signal lines communicating one or more clock signals. The exemplary clock signal in the following description originates at an external clock source 17 and travels down one signal line towards the master 10. This first clock signal 15 is often referred to as a Clock-To-Master (CTM). At some point, typically at master 10, CTM 15 is turned around to form a second clock signal, Clock-From-Master (CFM) 16 which travels away from master 10 down another signal line.

While a CTM/CFM set of clock signals is used to describe the present invention below, one of ordinary skill in the art will recognize that the present invention is applicable to bus systems using a single clock signal or a plurality of clock signals, whether such clock signals are internally generated within the bus system or externally generated. Further, while the exemplary CTM/CFM set of clock signals traverse the entire length of the communications channel defined by the bus, the present invention finds application in bus systems which use more localized clock signals communicated between a more limited set of bus system components.

Returning to the bus system shown in FIG. 1A, it is assumed that a plurality of modules is inserted into connectors 11b through 11n. Each one of these modules receives information from master 10 in relation to CFM 16. Similarly, each one of these modules transmits information to master 10 in relation to CTM 15. In order for the bus system to function properly, CTM 16 and CFM 15 must operate within very high tolerances. Accordingly, means are required to measure (or detect) the clock signals and, where necessary, to adjust the timing characteristics of the clock signals.

Conventionally, a special timing module is used to measure and adjust the clock signals. In their physical form, conventional timing modules are configured much like other modules 13 populating connectors 11. However, rather than transmit and receive information to/from master 10, the conventional timing module receives the clock signals from their corresponding signal lines and provides one of a group of selectable delays to the received clock signals. For example, 10, the conventional timing module may provide a clock signal delay selected from a group of delays, such as, (−100 ps, −50 ps, 0 ps, +50 ps, and +100 ps).

Once inserted into the bus system via a connector, the conventional timing module provides a test point through which a test set of test instrument may detect the actual timing characteristics of a clock signal traversing the bus, and compare the actual timing characteristics to a reference. As necessary, a fixed adjustment delay is selected from the set of possible clock signal delays and applied to the clock signal. Such measurement and adjustment are typically made by a technician during the debugging stage of the bus system's implementation.

A number of problems are associated with the use of a conventional timing module. First, the conventional timing module occupies a connector. Channel length is an important bus system design consideration, and a full bus system configuration (i.e., a maximum number of modules per given channel length) can not be achieved when a conventional timing module occupies a connector.

Second, the conventional timing module provides a fixed, preset adjustment. No provision is made for dynamically adjusting a clock signal delay during bus system operation. If the clock signal wanders after being adjusted, or if the clock signal needs to be skewed to test the bus system timing margins, then the bus system must be shut down and a new timing module manually inserted into the channel. This repeated intervention by a technician is costly, time consuming, and prone to human error.

SUMMARY OF THE INVENTION

The present invention generally provides a timing module which is directly inserted into one or more signal lines communicating clock signals. Such an approach allows a full bus system configuration. Further, the timing module according to the present invention may adjust clock signal delay during bus system run-time, such that technician intervention, subsequent clock adjustment, and bus system re-initialization are avoided. In contrast to the conventional timing module, the timing module of the present invention allows clock signal timing margins to be further optimized electronically by the bus system master, or a separately connected controller.

Thus, in one aspect the present invention provides a bus system including a master mounted on a motherboard, and a bus comprising a plurality of signal lines traversing the motherboard and connecting the master to a plurality of connectors. Each connector is adapted to receive a module, and the plurality of signal lines includes a clock signal line communicating a clock signal within the bus system. The bus system also comprises a timing module connected to the clock signal line without use of one of the plurality of connectors, and connected to a controlling device. The timing module is adapted to receive the clock signal and adjust the clock signal in relation to a control signal from the controlling device.

In another aspect, the present invention provides a timing module in a bus system adapted to receive and adjust a clock signal, the module comprising; an I and Q generator receiving the clock signal and generating a Q signal and an I signal, wherein the Q signal and I signal are normal one to another, a first balanced modulator receiving the Q signal and a first modulation control signal, and generating a modulated Q signal in response thereto, a second balanced modulator receiving the I signal and a second modulation control signal, and generating a modulated I signal in response thereto, and a transformer circuit combining the modulated Q signal and the modulated I signal to form a phase adjusted clock signal.

In yet another aspect, the present invention provides a method of adjusting a clock signal in a bus system, wherein the bus system comprises a master connected to a plurality of connectors via a bus, each one of the connectors is adapted to receive a module, and the bus comprising a plurality of signal lines including a clock signal line communicating a clock signal, wherein the bus system further comprises a timing module connected to the clock signal line, and where the method comprising; detecting the clock signal from the clock signal line outside of any one of the plurality of connectors and generating clock signal information, communicating the clock signal information to a controlling device, comparing the clock signal information to a reference, defining a control signal in relation to the comparison, applying the control signal to the timing module to adjust the clock signal, and adjusting the clock signal in relation to the control signal.

DESCRIPTION OF THE INVENTION

As described below consistent with a presently preferred embodiment, the timing module of the present invention may be implemented as a simple analog circuit. Clearly the functionality of this analog circuit may be implemented in a custom integrated circuit (IC). However, the present invention does not require an expensive custom IC. Further, the following preferred embodiment illustrates in a clear and straight forward manner the nature of the present invention. Recognizing that those skilled in the art may develop any number of competent designs to accomplish the purposes and dictates of the present invention, the following embodiment is merely an example. In contrast, the present invention is defined by the attached claims.

Figure 1A:
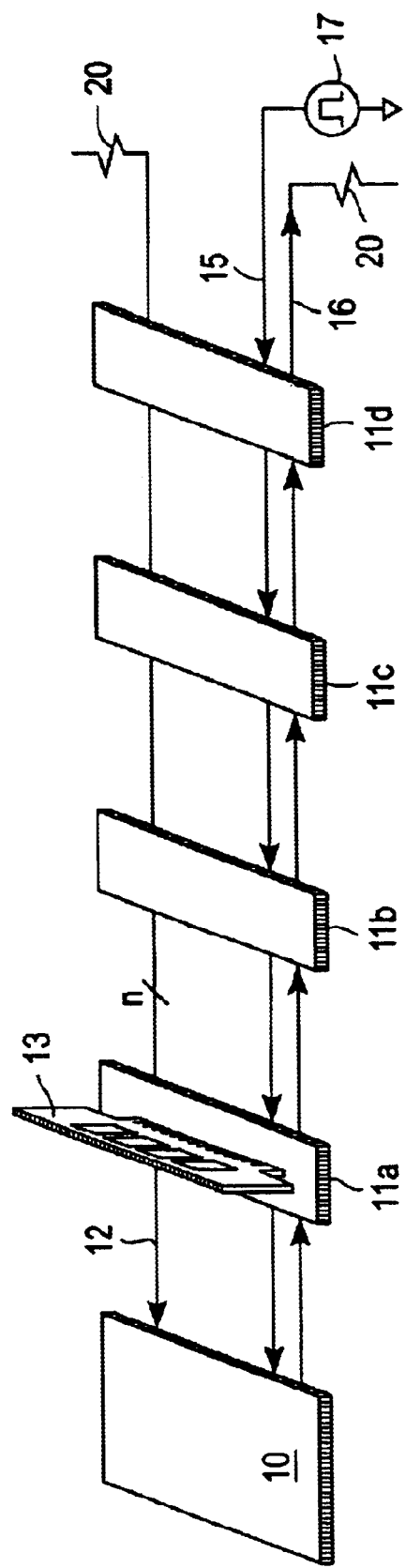
FIG. 1A illustrates a conventional bus system.
Figure 1B:
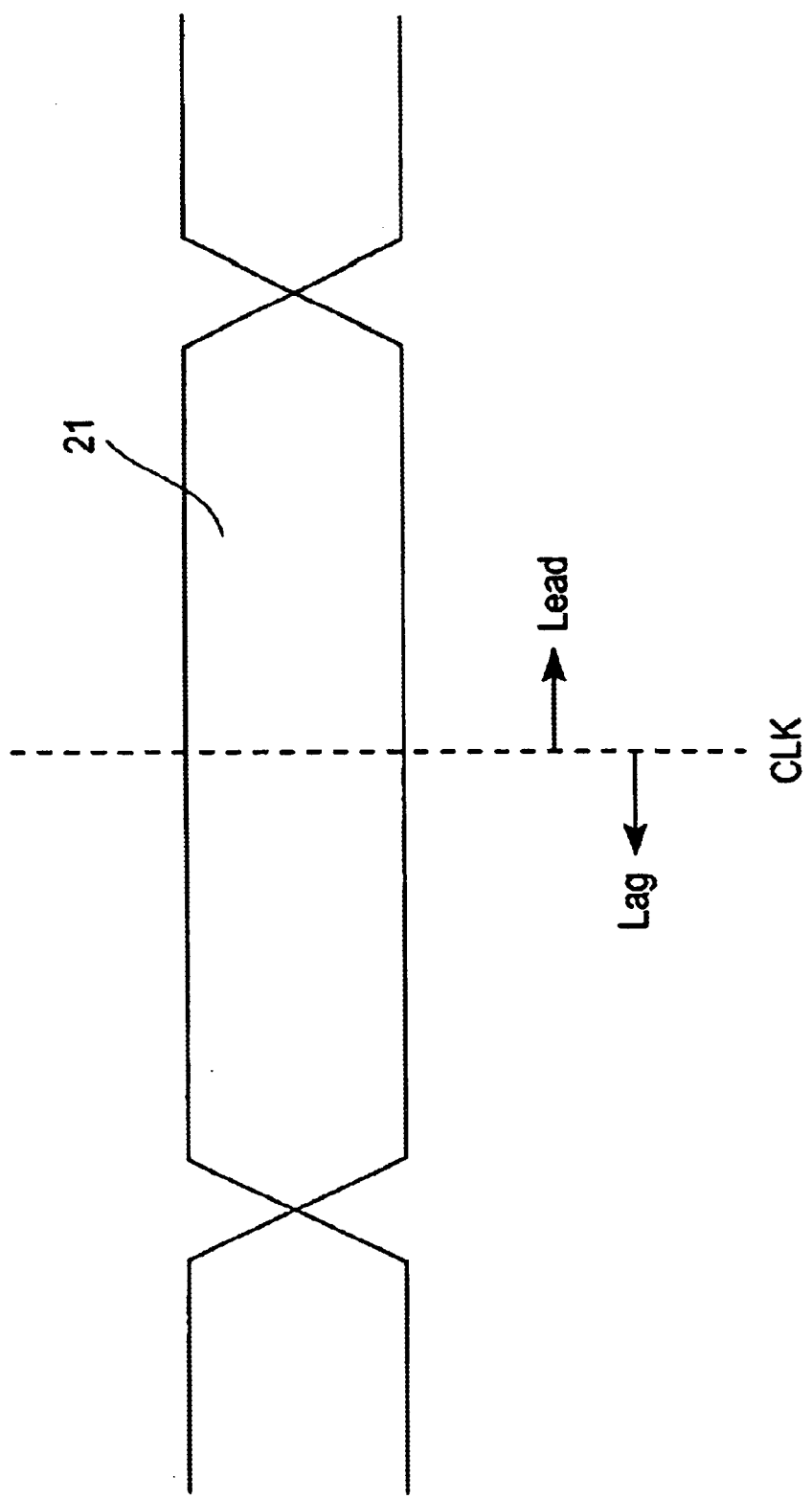
FIG. 1B illustrates an ideal relationship between a clock signal and corresponding data window in a synchronous bus system.

The timing module according to the present invention has, among other objects, the same goals as the conventional timing module, e.g., adjusting the timing characteristics of a clock signal to maximize bus system timing margins, and/or providing a tool whereby bus system operating parameters, such as device set-up and hold time, may be measured, adjusted, and/or evaluated. Looking a FIG. 1B, a data window 21, (i.e., a period of time during which information of the bus is valid), is shown in relation to clock signal CLK. Ideally, the clock signal would occur in the exact center of the data window, thereby providing maximum timing margins from the edges of the data window. A significant migration of the clock signal from the center of the data window will threaten information coherency.

The physical elements (latches, output drivers, etc.) of the bus system that communicate information via the bus require some finite period of time to set-up and perform their respective functions. Thus, the specification of such set-up and hold times, and well as the specification of the data window itself are integrally related to the timing tolerance ascribed to the clock signal. Accordingly, a highly stable clock signal in relation to the center of a desired data window allows greater flexibility in the definition of other timing requirements, such as device set-up and hold times.

Figure 2:
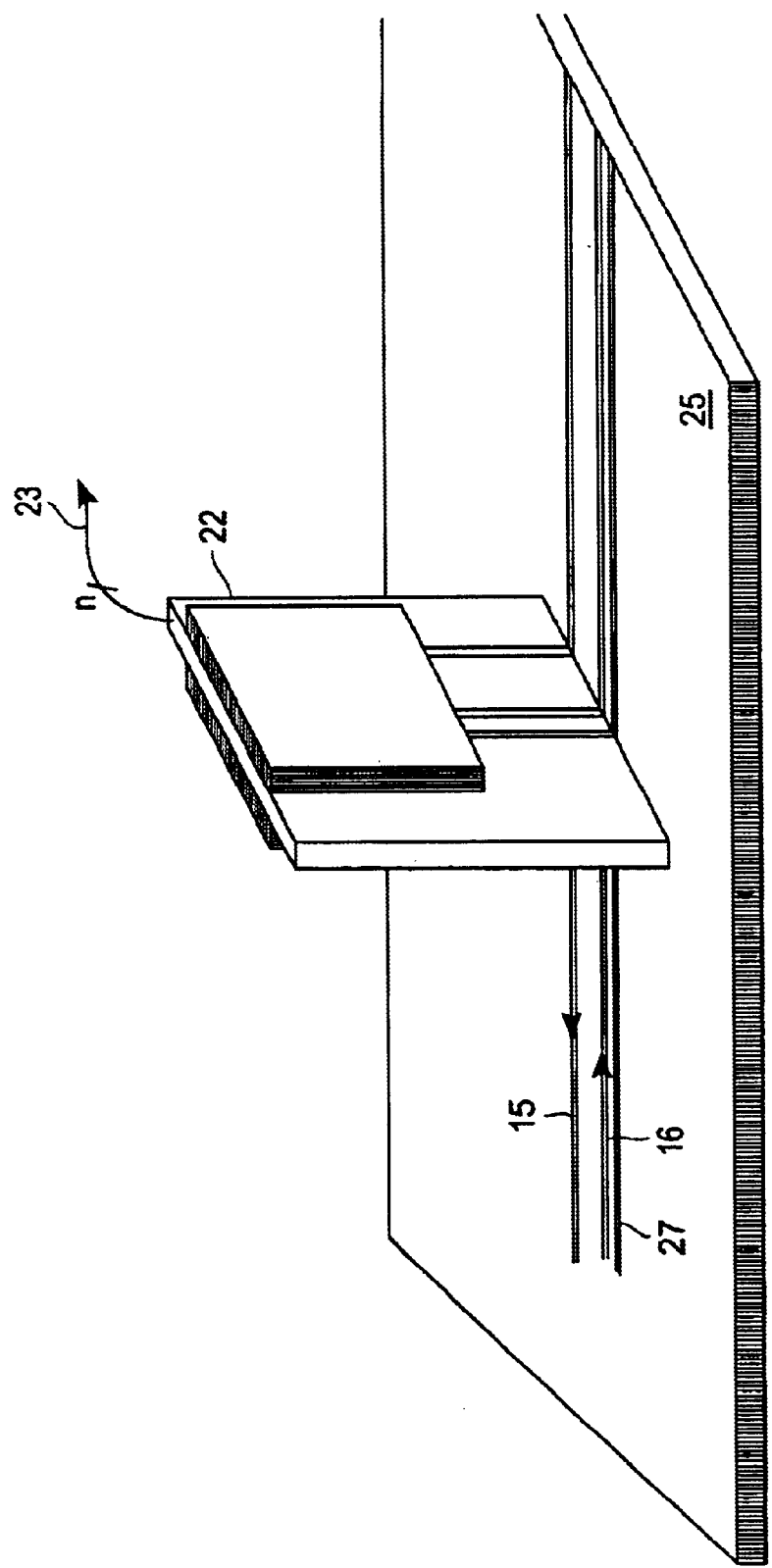
FIG. 2 illustrates one possible physical embodiment of the timing module according to the present invention.

Physically, the timing module of the present invention is illustrated in FIG. 2. Unlike the conventional timing module, the inventive timing module does not occupy a connector within the bus system. Rather, the timing module of the present invention may be placed directly on motherboard 25 and is inserted into the signal lines communicating the clock signals. Consistent with the working example, the timing module 22 of FIG. 2 receives two clock signals CFM and CTM respectively communicated on signal lines 16 and 15.

The timing module of FIG. 2 is implemented in a vertically disposed form factor in order to minimize its footprint on motherboard 25. However, a horizontally disposed timing module might be used, for example, where the vertical profile of the bus system is an issue. Further, while FIG. 2 shows a single timing module receiving a plurality of clock signals, CFM and CTM, a separate timing module might be used for each clock signal line. This is particularly true for a bus system having widely separated clock signal traces.

In one preferred embodiment, the timing module is placed between the first connector 11a and master 10. See FIG. 1A. However, the timing module may be placed anywhere along the clock signal lines between the external clock source 17 and master 10. Furthermore, multiple timing modules may be used at predetermined distances along the clock signal lines to provide multiple timing adjustments over the length of the channel. Where the connectors and/or the inserted modules in the bus system produce undesired variations in a clock signal, such variations may be immediately corrected by a timing module before the clock signal is communicated to another module along the channel. In effect and with reference to FIG. 1A, the timing module(s) of the present invention may be placed, before connector 11a, between any two connectors 11a . . . 11n. and/or after connector 11n.

Timing module 22 of FIG. 2 further includes a programming connection 23. This programming connection may take many different physical forms including; a serial data line, a coaxal cable, a multi-pin ribbon connection, a standard connector jack, etc. Alternatively or in addition to programming connection 23, a timing module control signal line 27 may be routed to the one or more timing modules on motherboard 25. The timing module control signal line 27 may be one or more signal lines normally providing control information to the modules 13, or it may be a dedicated signal line(s) run from master 10 to each of the timing modules 22 on motherboard 25.

Using programming connection 23 and/or timing module control signal line 27, timing module 22 may communicate with one or more controlling device(s), or test equipment (not shown). The controlling device(s) may include one or more master(s) 10, or a global bus system controller or a higher level controlling program. During bus system operation, one or more of the controlling devices(s) may determine the timing characteristics for a particular clock signal, and if necessary adjust the clock signal in accordance with a reference. Reprogramming of the clock signal may take place, for example, during idle bus system cycles. Furthermore, programming connection 23 and/or timing module control signal line 27 may be used to interrogate and program a timing module using specialized test equipment during system test and initialization. This capability is particularly useful during debugging procedures where timing margins are in question.

There are many ways to "program" the timing module of the present invention. An appropriate programming technique will be determined in accordance with the specific design of the timing module. For example, a controlling device might write a digital control value into a register located on timing module 22 when the associated clock signal needs adjustment. Either open-loop or closed-loop control techniques may be used to effect clock signal adjustment.

Figure 3:
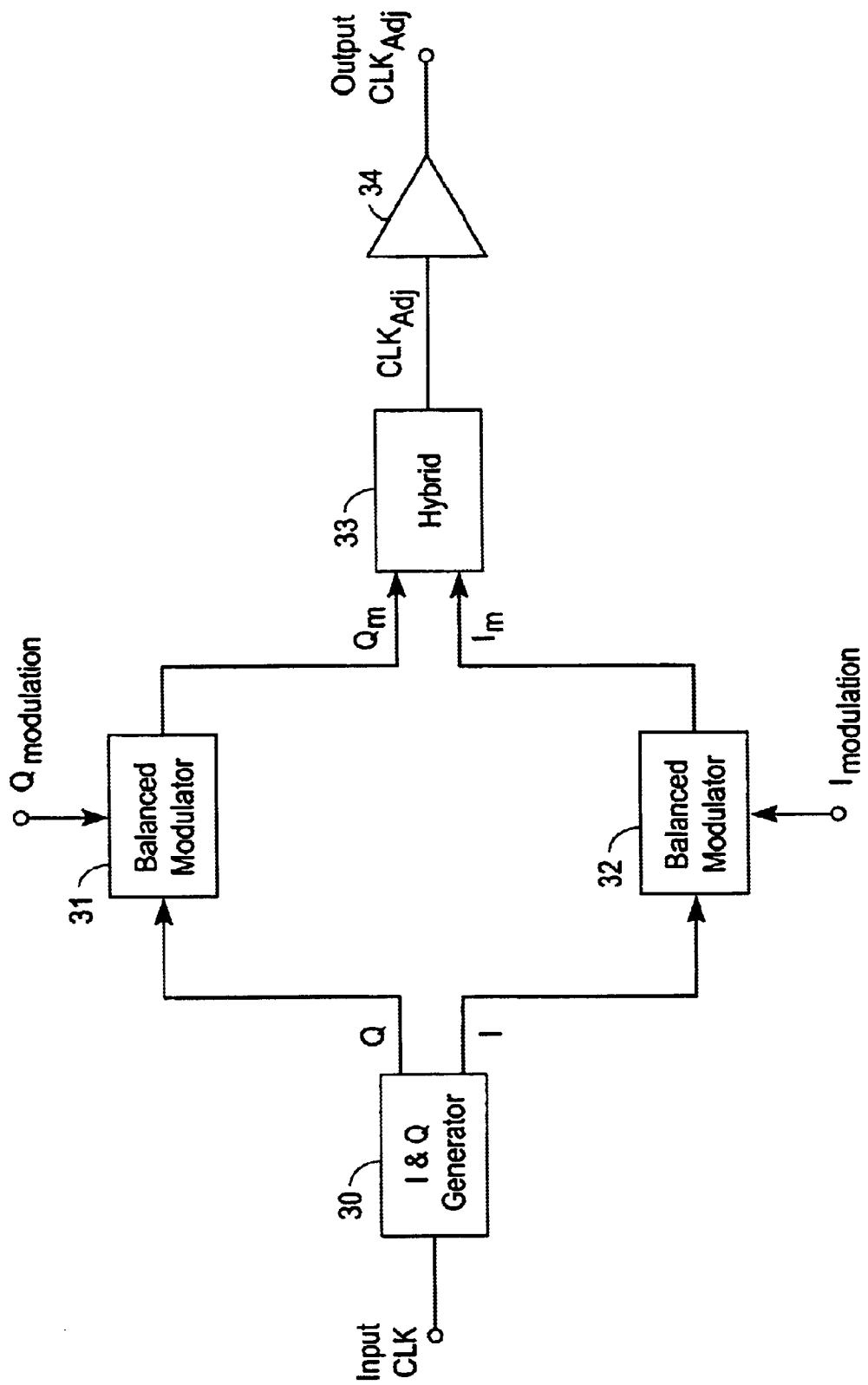
FIG. 3 is a block diagram illustrating an exemplary analog circuit providing the desired functionality of the timing module according to the present invention.

The block diagram of FIG. 3 illustrates one presently preferred embodiment of a timing module according to the present invention. An I & Q generator 30 receives at least the clock signal (CLK) at its input and generates an I signal and a Q signal. The Q signal is applied to first balanced modulator 31 which also receives a Q modulation control signal from the controlling device (not shown) and generates signal Qm. The I signal is applied to second balanced modulator 32 which also receives an I modulation control signal from the controlling device and generates signal Im. Signals Qm and Im are applied to a hybrid transformer circuit 33 which generates an adjusted clock signal $CLK_{Adj}$, which is amplified in 34 and output back onto the clock signal line.

Figure 4:
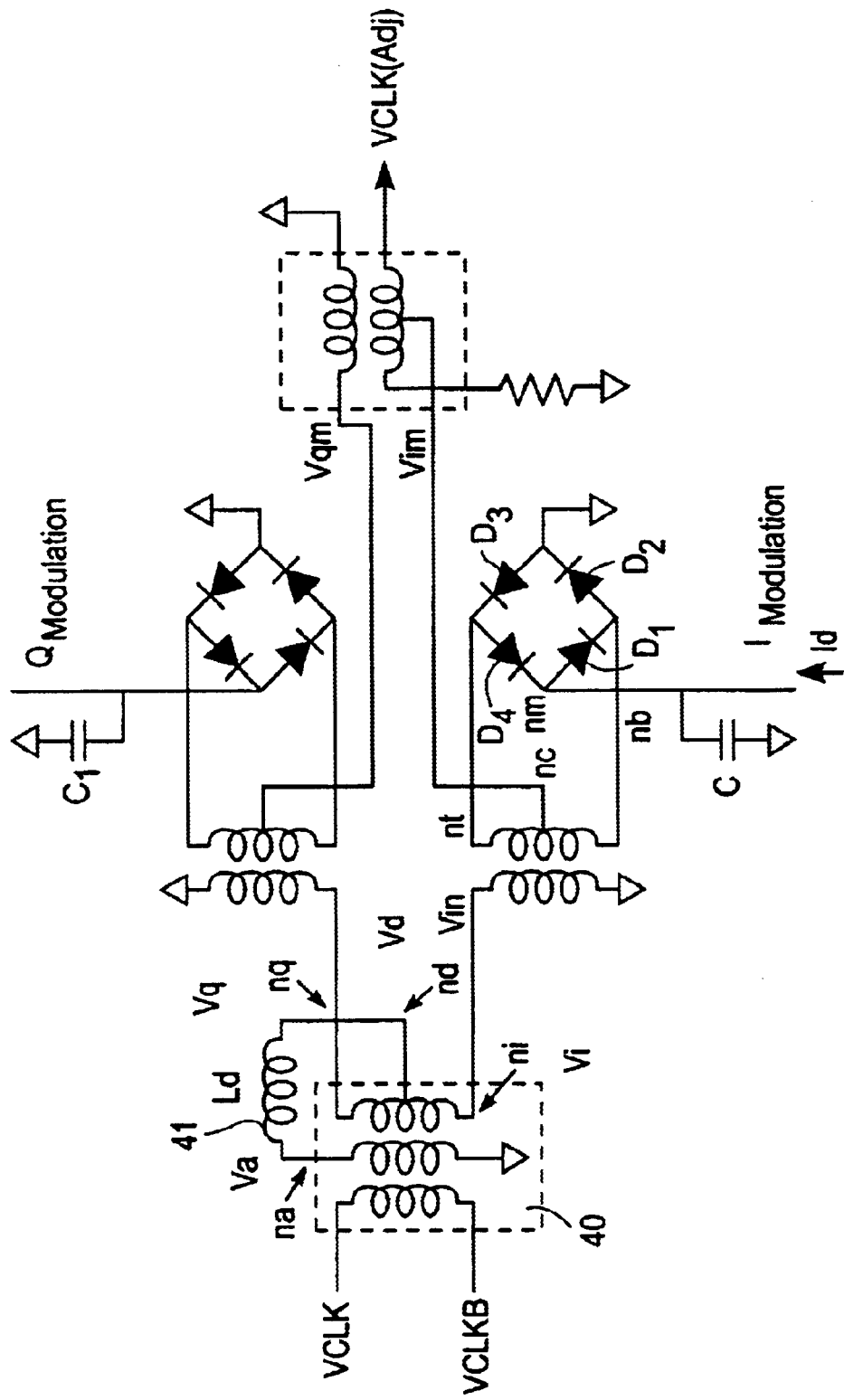
FIG. 4 is a more detailed description of the circuit of FIG. 3.

This embodiment is further illustrated in FIG. 4. The voltage level of the clock signal (VCLK) and its complement (VCLKB) are applied to input ends of a transformer element 40. A delay coil 41 is connected to transformer element 40 to provide a version of the input clock signal VCLK delayed by 90°. With this arrangement, the voltage at node na is Va, the voltage at node nd is Vd, the voltage at node ni is Vi, and the voltage at node nq is Vq. Further, the voltage across nodes nq and nd is termed Vqd and the voltage across nodes ni and nd is termed Vid.

Figure 5A:
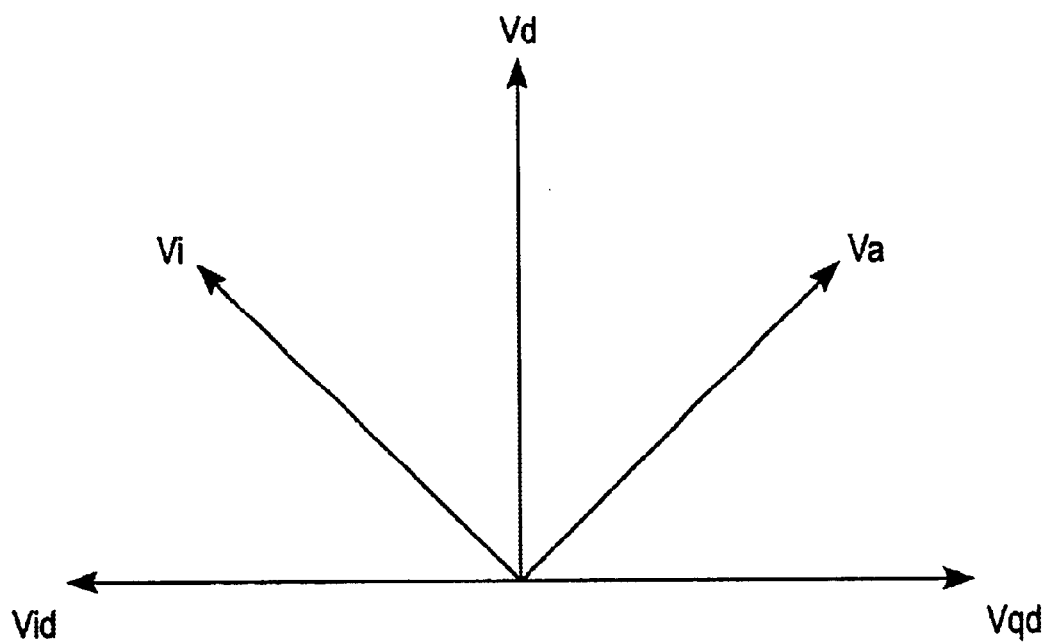
FIG. 5A illustrates the phase relation ship between several signals in the circuit of FIGS. 3 and 4.

With these definitions, voltage Vd has a phase which is 90° behind Va (and VCLK) due to the inductance (Ld) provided by delay coil 41. The phase of Vqd is the same as Va while the phase of Vid is 180° behind Vqd because ni is at the opposite side of the center tapped transformer. Further, |Vid|=|Vqd| and Vid=−Vqd because ni and nq are on opposite side of the center tapped transformer. Accordingly, voltage Vq may be defined as the sum of Vd+Vqd, and voltage Vi may be defined as the sum of Vd and Vid, as shown in FIG. 5A. By adjusting the turn ratio of transformer element 40, the amplitude of Vqd can be made the same as Vd. In such a case, |Vqd|=|Vid|=|Vd|, therefore Vq will be 45° ahead of Vd and Vi will be 45° behind Vd. In this manner, Vq and Vi are placed exactly 90° apart. In this relationship, voltages Q and I are respectively applied to first and second balanced (amplitude) modulators 31 and 32.

Using a controllable diode resistance Rd, where Rd=kd/Id, each balanced modulator is able to respectively adjust the amplitude of signals Q and I. Small signal AC diode resistance varies inversely proportional to current value of the (Q or I) modulation control signal, Id. Thus, by varying the current value, Rd may be controlled. Further, the voltage polarity induced across resistor RL follows the direction of current flow for Id. RL is the equivalent input resistance of the hybrid transformer.

Figure 5B:
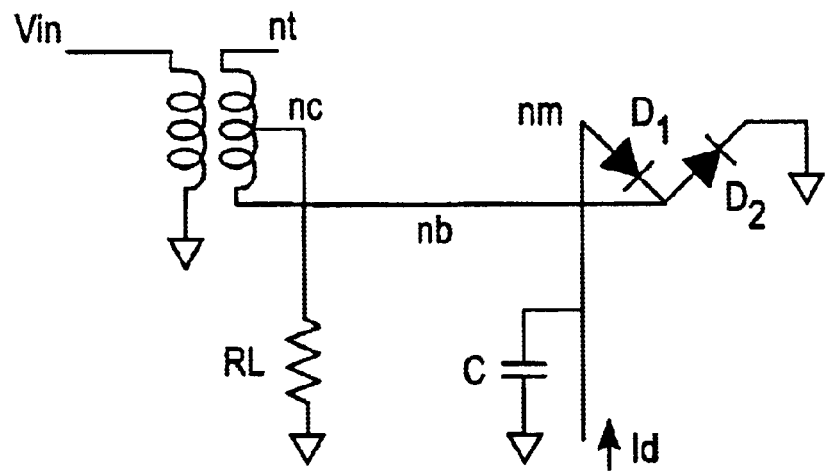
FIGS. 5B and 5C are equivalent circuits further explaining the operation of the circuit shown in FIG. 4 in relation to a exemplary control signal(s).
Figure 5C:
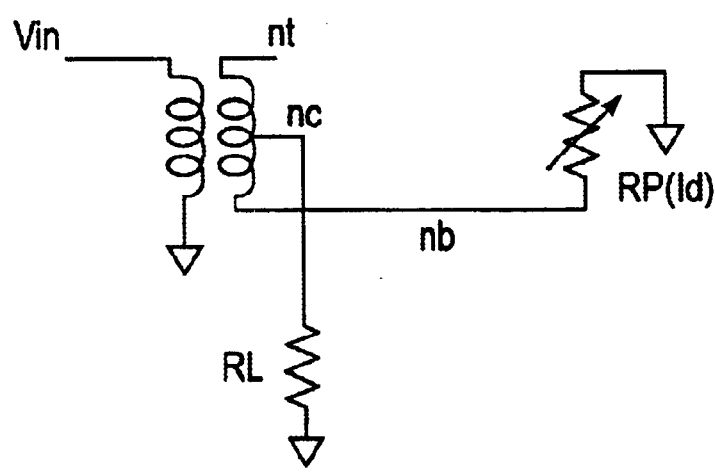

With current Id flowing into node nm, the balanced modulator circuit (31 or 32) may be seen in FIG. 5B. Here, diodes D3 and D4 are reversed biased and can be considered open. Diodes D1 and D2 act as a current controlled resistor element. Bypass capacitor C shorts the high frequency signal at nm to ground. The equivalent circuit of this arrangement is shown in FIG. 5C in which Vnc=Vin*K*RL/(RL+RP), where K is a constant proportional to the transformer turn ratio and resistance RP (which varies as a function of Id) is equal to the parallel combination of the diode resistance of RD1 and RD2.

Reversing the flow of current Id will reverse the bias on diodes D1, D2, D3, and D4 with the effect that D3 and D4 will act as controlled resistor RP.

Thus, by varying the control currents Id applied to the balanced modulators 31 and 32, the voltage magnitudes (respectively Vqm and Vim) of Qm and Im may be varied in both the positive and negative directions. These voltages are added in the hybrid transformer circuit 33 to yield an adjusted clock signal VCLK(Adj). The adjusted clock signal may be made to vary continuously between 0° and 360° by control of signals Qm and Im in relation to the Q modulation signal and the I modulation signal applied respectively to balanced modulator 31 and 32. This ability compares very favorably to use of the conventional timing module which provides only a limited set of fixed delays.

The controlling modulation signals may be developed in many ways, depending on the nature of the circuit providing clock signal adjustment with the timing module of the present invention. In the foregoing example, Q modulation and I modulation signals are developed from values stored in a look-up table accessed by the controlling device.

The simple analog circuit described above is capable of receiving a clock signal and modifying, as needed, the timing characteristics (i.e., the phase) of the clock signal according to a control signal provided by a controlling device. As noted above, many other circuits, analog and/or digital, may be designed to receive (detect) the clock signal and adjust its phase in accordance with a reference to further optimize the clock signal performance. For example, an analog or digital delayed locked loop, or a collection of selectable delay elements might be used to define a clock signal delay in relation to a digital control value.

Further, clock signal performance has been related above to a data window event in a synchronous bus system. However, clock signal adjustments may be made in relation to any one of a number of other system events or characteristics. For example, a subsystem clock may be adjusted in relation to a master system clock. A system clock may be altered in relation to environmental conditions such as temperature.

Whatever the reference event and however implemented, the present invention contemplates a timing module capable of automatically adjusting the clock signal during bus system operation. No technician intervention is required. Using the programming connection and/or timing module control signal line described above, a controlling device is able to detect a clock signal and provide one or more control signals capable of adjusting the clock signal in relation to the reference.

The timing module of the present invention may be placed directly on the signal lines communicating one or more clock signals. These signal lines may be disposed on a bus system motherboard. Accordingly, the timing module of the present invention does not occupy a connector, otherwise useable by a module. A given channel length may thus be fully populated with modules.

What is claimed is:

1. A programmable timing module adapted to be coupled to a bus clock signal, the programmable timing module comprising:
    a signal generator coupled to the clock signal and configured to generate first and second signals based on the clock signal, wherein the first and second signals have a phase separation of about 90 degrees;
    a first modulator adapted to receive the first signal and a first modulation control signal, and generating a modulated first signal in response thereto;
    a second modulator adapted to receive the second signal and a second modulation control signal, and generating a modulated second signal in response thereto;
    a combiner circuit coupled to the modulated first signal and the modulated second signal and configured to combine the modulated first signal and the modulated second signal to provide a phase adjusted clock signal.

2. The timing module of claim 1, wherein the generator includes a transformer element.

3. The timing module of claim 2, wherein the first and second modulators each comprise a diode resistive element respectively controlled by electrical current values of the first and second modulation control signal.

4. The timing module of claim 1, wherein at least one of the first and second modulators is a balanced modulator.

5. The timing module of claim 1, wherein at least one of the first and second modulators includes a diode bridge.

6. The timing module of claim 1, wherein the combiner circuit includes a hybrid transformer.

7. The timing module of claim 1, wherein at least one of the first and second modulation control signals is based on a value stored in a look-up table accessed by the controlling device.

8. The timing module of claim 1, wherein the signal generator includes a transformer element coupled to a delay coil to provide a delayed version of the clock signal.

9. The timing module of claim 1, wherein at least one of the first and second signals is generated from the complement of the clock signal.

10. A programmable timing module adapted to be coupled to a bus system, comprising:
    a first interface coupled to receive a clock signal from the bus system;
    a second interface coupled to receive a control signal from a controlling device; and
    a programmable timing module adapted to receive the clock signal and the control signal and configured to automatically and continuously phase adjust the clock signal between about 0 degrees and about 360 degrees in relation to the control signal during run-time of the bus system.

11. The timing module of claim 10, wherein the control signal is an electrical current value.

12. The timing module of claim 11, wherein the electrical current value is defined in relation to a data window in the bus system during which time data is valid on the bus system.

13. The timing module of claim 10, wherein the second interface is adapted to couple the timing module to external test equipment.

14. The timing module of claim 10, wherein the timing module is placed on a circuit board and couple to a signal line communicating the clock signal.

15. The timing module of claim 14, wherein the circuit board is a bus system motherboard.

16. The timing module of claim 10, wherein the control signal is based on a control value stored in a look-up table accessed by the controlling device.

17. The timing module of claim 16, wherein the timing module includes a register for storing the control value.

18. The timing module of claim 10, wherein the clock signal is a subsystem clock signal and the timing module is configured to phase adjust the subsystem clock signal using a master system clock signal.

19. A method of adjusting a clock signal in a bus system, comprising;
    generating a first signal and a second signal based on the clock signal, wherein the first and second signals have a phase separation of about 90 degrees;
    generating a modulated first signal in response to a first modulation control signal;
    generating a modulated second signal in response to a second modulation control signal; and
    combining the modulated first signal and the modulated second signal to provide a phase adjusted clock signal.

20. The method of claim 19, further comprising:
    retrieving a control value from a look-up table; and
    generating at least one of the first and second modulation signals from the control value.

21. The method of claim 19, wherein at least one of the first and second signals is generated from the complement of the clock signal.

22. A method of adjusting a clock signal in a bus system, comprising:
    receiving a clock signal from the bus system;
    receiving a control signal from a controlling device; and
    automatically and continuously adjusting the phase of the clock signal between about 0 degrees and about 360 degrees in relation to the control signal during run-time of the bus system.

23. The method of claim 22, further comprising:
    retrieving a control value from a look-up table; and
    generating the control signal from the control value.

* * * * *